Sept. 8, 1964 W. N. ENGEL 3,147,733

INLET SCREEN

Filed May 1, 1963

INVENTOR.
WILLIAM N. ENGEL
BY
Lockwood, Woodard, Smith & Weikart
Attorneys

… … …

United States Patent Office 3,147,733
Patented Sept. 8, 1964

3,147,733
INLET SCREEN
William N. Engel, St. Louis County, Mo., assignor to The Buehler Corporation, Indianapolis, Ind., a corporation of Indiana
Filed May 1, 1963, Ser. No. 277,155
5 Claims. (Cl. 115—.5)

The present invention relates to an intake strainer or guard for the water intake opening of a water jet propelled boat.

One problem present in the construction and operation of water jet propelled boats is that of preventing debris and other matter in the water from entering the intake opening interfering with the operation of and causing damage to the pump and/or other components of the boat such as the gate and deflectors. In one conventional type of jet propelled boat the intake opening is located in the bottom of the boat and is arranged in parallel relation to the bottom of the boat. Thus, as the boat moves through or on the water, the intake opening is in generally parallel relation to the relative movement of the water and the boat and, in one manner of speaking, the flow of water adjacent the bottom of the boat is generally parallel to the intake opening.

Of course, a certain proportion of the water adjacent the bottom of the boat will flow somewhat upwardly into the intake opening to be acted upon by the pump. At very low speeds of the boat all of the water moving to the intake will enter. On the other hand, at very high speeds a substantial portion of the water flowing to the inlet moves on past the inlet. Also, depending on the inlet design, a portion of the water flowing part way into the intake opening also flows back out again at the rear of the intake opening.

The above factors have been made use of in the device disclosed in the Austin Patent No. 3,040,695 to produce a washing action of the strainer bars covering the intake opening of the jet boat. In certain environments where there is a large amount of weed growth and the like, there is a tendency for the growth to collect on the bars of the intake strainer. Consequently, a primary object of the present invention is to provide an intake strainer which incorporates improved means for disposing of weeds and for preventing their entry into the intake of the craft.

Still another object of the present invention is to provide a jet boat intake arrangement which prevents the jamming and packing of weeds at the intake.

Another object of the present invention is to provide an improved jet boat intake arrangement.

Related objects and advantages will become apparent as the description proceeds.

In accordance with the present invention there is provided an intake arrangement for use in a jet boat, said intake arrangement including a downwardly facing intake opening arranged generally parallel to water flow. A plurality of spaced elongated bars are mounted upstream of the opening and have free end portions extending downstream in covering relation to the intake opening. The bars extend nearly completely across the intake opening and have distal ends which are spaced downwardly and upstream of the downstream edge portion of the intake opening.

The full nature of the invention will be understood from the accompanying drawings and the following description and claims.

Figure 1:
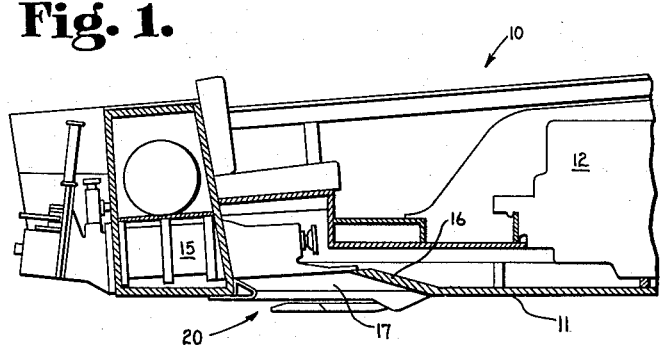
FIG. 1 is a longitudinal vertical section of a jet propelled boat embodying the present invention.

Referring now more particularly to the drawings, there is illustrated a jet propelled boat 10 having a hull 11 and an engine 12 mounted within the hull. The engine is arranged to drive a pump 15 which is mounted within a conduit 16 having an intake opening 17 at the bottom of the boat and extending through the boat so as to open through the rear of the boat. In operation, water is pumped by means of the pump 15 through the intake opening 17 into the conduit 16 and out the rear of the boat causing the boat to move.

Figure 2:
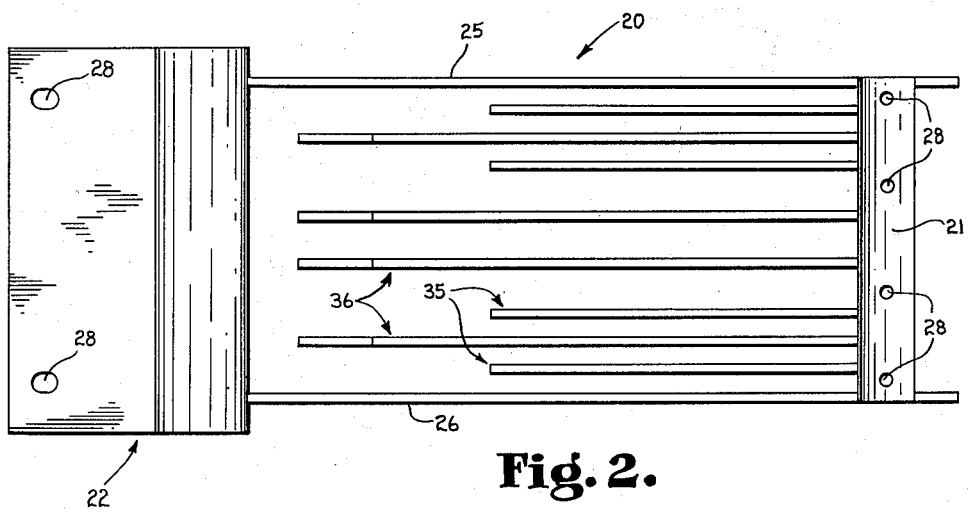
FIG. 2 is a top plan view of an intake strainer forming a part of the jet boat of FIG. 1 and embodying the present invention.
Figure 3:
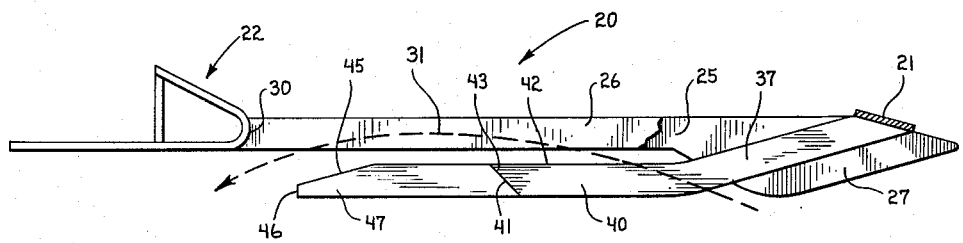
FIG. 3 is a side elevation of the intake strainer of FIG. 2 with certain portions removed in order to clearly illustrate the invention.

Fixedly mounted at the intake opening 17 is an intake strainer indicated generally by the numeral 20 and illustrated in detail in FIGS. 2 and 3. The intake strainer includes a forward plate 21 and a curved rearward plate 22, said plates being fixed in spaced relation by means of elongated members or bath 25 and 26, the bars 25 and 26 being fixed at their rearward ends to the rearward plate 22 and at their forward ends to the plate 21. It will be noted from FIG. 3 that the bars 25 and 26 each have a downwardly projecting portion 27. The downwardly projecting portions 27 are located on opposite sides of the strainer and act as a guide means preventing debris from entering the intake opening 17 at the forward sideward portions thereof. The intake strainer 20 is fixed to the boat at the intake opening by means of suitable bolts or screws extending through a plurality of spaced bores 28 located in the forward and rearward plates 21 and 22.

It can be seen from FIGS. 1 and 3 that the rearward plate 22 defines the downstream edge portion of the intake opening 17 and provides a convex shape 30 which is part-circular in cross section and has an axis which extends perpendicularly to the direction of the flow of water along the bottom of the boat. The convex shape of the rearward plate 22 causes a portion of the water flowing along the bottom of the boat to move as indicated by the arrow 31 in FIG. 3, that is to move into the intake opening and out again. This flow pattern produced by the convex shape of the plate 22 cooperates with the structure described below to prevent debris from entering the conduit 16 and to prevent collection of the debris such as seaweed and the like upon the bars so as to cause jamming of the intake.

A plurality of elongated bars or rods 35 and 36 are fixed to the plate 21 and extend downstream in covering relation to the intake opening. The bars curve outwardly of the intake opening at the proximal portions 37 thereof and extend parallel to the intake opening at the distal portions 40 thereof. The bars 35 are shorter than the bars 36, and in fact extend only about half-way across the intake opening. Each of the bars 35 terminates in a surface 41 which is arranged at 45° to the bars 25 and 26 and to the bottom of the boat. The surface 41 defines, with the upper surface 42 of the shorter bars 35, a point 43 which projects generally upwardly toward the intake opening.

The longer bars 36 have at their distal ends a surface 45 which is arranged at 15° to the horizontal and a surface 46 which is at 90° to the horizontal. The distal ends 47 of the longer bars 36 are spaced downwardly and forwardly of the downstream edge portion 30 of the plate 22. Because of this relationship and because of the configuration of the distal ends 47, any seaweed or the like which might collect upon the distal ends of the bars 36 are washed away by the water flowing along the path 31 and between the bars 36 and the curved surface 30. Thus, the construction of the bars 36 and their location relative to the plate 22 prevent seaweed and debris from collecting on the distal ends of the bars. Also, the fact that the bars 36 point generally downwardly by reason of the tapered surface 45 tends to guide the debris away from the intake opening.

The shorter bars 35 are shortened to eliminate the possibility of seaweed jamming the intake opening. While it is undesirable to have seaweed passed into the pump 15, it is even more undesirable to have seaweed jamming the intake opening and starving the pump of water. The construction of the shorter bars 40 causes most seaweed to be deflected away from entry into the intake. However, if a substantial portion of seaweed collects upon the bars 35 and 36 it will not jam up the intake opening but instead will pass along the bars 35, thence upward between the bars 36. As mentioned above, the shorter bars 35 are pointed upwardly by reason of the 45 angle surface 41. This construction encourages any weeds which are still on the bar 35 upon reaching the end of the bar to move upwardly into the intake opening rather than to snag on the end of the bar.

From the above description, it can be seen that the present invention provides an improved intake strainer for the intake opening of a water jet propelled boat.

It can also be seen that the present invention provides a jet boat intake arrangement which prevents the jamming and packing of weeds at the intake and which also prevents the collection of a mass of seaweed at the downstream edge of the intake opening.

In the present specification and claims, liquid or water is referred to as flowing along the hull into the intake opening and conduit. It should be understood that the intended meaning of such terminology is relative movement between the liquid and structure. For example, as a jet boat moves in the water, it is conceivable that the water outside the hull would not move at all when the earth is used as the frame of reference. However, if the boat is used as the frame of reference, the liquid is flowing along the hull and into the intake opening.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In a jet boat an intake arrangement comprising a downwardly facing intake opening arranged generally parallel to liquid flow, a plurality of spaced elongated bars mounted upstream of said opening and having free portions extending downstream in covering relation to said intake opening, said bars extending nearly completely across said intake opening and having distal ends which are spaced downwardly and upstream of the downstream edge portion of said intake opening.

2. In a jet boat an intake arrangement comprising a downwardly facing intake opening arranged generally parallel to liquid flow, a plurality of spaced elongated bars mounted upstream of said opening and having free portions extending downstream in covering relation to said intake opening, some of said plurality being shorter than others of said plurality and extending approximately halfway across said intake opening, the longer bars of said plurality of bars extending nearly completely across said intake opening and having distal ends which are spaced downwardly and upstream of the downstream edge portion of said intake opening.

3. In a jet boat an intake arrangement compirsing a downwardly facing intake opening arranged generally parallel to liquid flow, said intake opening having a downstream edge portion which is outwardly bowed, a plurality of spaced elongated bars mounted upstream of said opening and having free portions extending downstream in covering relation to said intake opening, some of said plurality being shorter than others of said plurality and extending approximately halfway across said intake opening, the longer bars of said plurality of bars extending nearly completely across said intake opening and having distal ends which are spaced outwardly and upstream of said downstream edge portion.

4. In a jet boat an intake arrangement comprising a downwardly facing intake opening arranged generally parallel to liquid flow, said intake opening having a downstream edge portion which is outwardly bowed, a plurality of spaced elongated bars mounted upstream of said opening and having free portions extending downstream in covering relation to said intake opening, some of said plurality being shorter than others of said plurality and extending approximately halfway across said intake opening, the longer bars of said plurality of bars extending nearly completely across said intake opening and having distal ends which are spaced outwardly and upstream of said downstream edge portion, and which taper downwardly at an angle of fifteen degrees to the length of said bars, said shorter bars having distal ends which taper upwardly at an angle of 45° whereby said shorter bars are pointed at their upper surfaces.

5. In a jet boat an intake arrangement comprising a downwardly facing intake opening arranged generally parallel to liquid flow, said intake opening having a downstream edge portion which is outwardly bowed, a plurality of spaced elongated bars mounted upstream of said opening and having free portions extending downstream in covering relation to said intake opening, said bars curving outwardly of said intake opening from the proximal ends of said bars with the distal portions of said bars extending generally parallel to said intake opening outside thereof, some of said plurality being shorter than others of said plurality and extending approximately halfway across said intake opening, the longer bars of said plurality of bars extending nearly completely across said intake opening and having distal ends which are spaced outwardly and upstream of said downstream edge portion, and which taper downwardly at an angle of 15° to the length of said bars, said shorter bars having distal ends which taper upwardly at an angle of 45° whereby said shorter bars are pointed at their upper surfaces.

No references cited.